United States Patent [19]

Webb et al.

[11] Patent Number: 4,656,938
[45] Date of Patent: Apr. 14, 1987

[54] BALER STUFFER MECHANISM

[75] Inventors: Bryant F. Webb, Ephrata, Pa.;
Donald O. Bigelow, Webster, N.Y.

[73] Assignee: New Holland Inc., New Holland, Pa.

[21] Appl. No.: 827,292

[22] Filed: Feb. 7, 1986

[51] Int. Cl.⁴ .................... B30B 1/26; A01D 39/00
[52] U.S. Cl. .................................... 100/189; 56/341
[58] Field of Search ............... 100/189, 142, 188 R; 56/341, 344

[56] References Cited

U.S. PATENT DOCUMENTS

| | | | |
|---|---|---|---|
| 1,437,921 | 12/1922 | Stobie | 100/189 |
| 2,417,309 | 3/1947 | Lisle et al. | 100/189 |
| 2,592,932 | 4/1952 | McClellan et al. | 100/189 |
| 2,926,601 | 3/1960 | Tarbox et al. | 100/142 |
| 4,009,558 | 3/1977 | Schulze et al. | 100/189 |
| 4,132,164 | 2/1979 | White | 100/189 |
| 4,157,643 | 6/1979 | White | 100/189 |
| 4,569,282 | 2/1986 | Galant | 100/189 |

Primary Examiner—Henry S. Jaudon
Assistant Examiner—Joseph S. Machuga
Attorney, Agent, or Firm—Darrell F. Marquette; Frank A. Seemar; Larry W. Miller

[57] ABSTRACT

A baler feed assembly includes a stuffer mechanism having a smooth acting lever or slotted member which moves between a substantially vertical position and a substantially horizontal position. The slotted member pivots about a fixed shaft and includes an upper slot and a lower slot. A crank shaft having a roller member associated therewith, engages the upper slot by means of the roller member to thereby impart motion to the slotted member so that the slotted member can move between the aforesaid positions. A spring is connected to the slotted member at one end and to a fixed support at another end. Preferably, the spring is connected so that its line of action is aligned with the center of the fixed shaft when the slotted member is in the substantially vertical position. By this construction, when the slotted member is moved from the vertical position, the spring insures that the roller member, associated with the crank shaft, is in engagement with only one side of the upper slot. This insures that the roller member is free of engagement with the other side of the upper slot, thereby insuring smooth and jitter-free motion of the stuffer mechanism.

8 Claims, 7 Drawing Figures

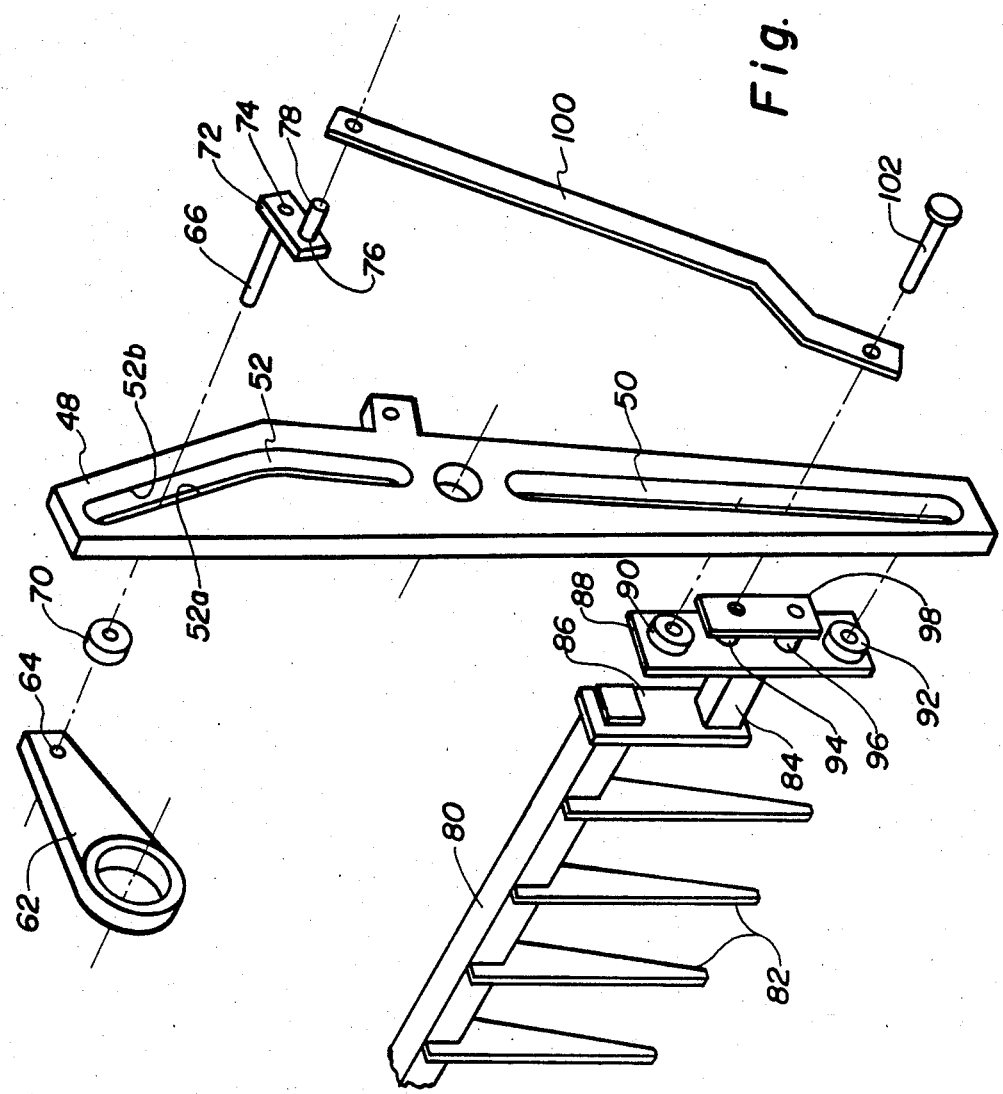

BALER STUFFER MECHANISM

SUMMARY OF THE INVENTION

This invention relates in general to baler feed assemblies for agricultural use and more particularly, to a stuffer mechanism for use in a baler designed to be drawn behind a tractor or the like over a field to pick up crop material and to bale it.

In accordance with the present invention, there is provided a baler feed assembly which comprises stuffer means which operates in a smooth and continuous motion.

It is an object of the invention to provide a stuffer mechanism having movements which are smooth and thereby result in a minimum amount of wear and require a minimum amount of maintenance to the stuffer mechanism.

A further object of the invention is to provide a stuffer mechanism which is simple in design, rugged in construction and economical to manufacture.

BRIEF DESCRIPTION OF THE DRAWINGS

FIG. 7 is an exploded view of a portion of the stuffer mechanism of FIG. 6.

DESCRIPTION OF THE PREFERRED EMBODIMENT

Figure 1:
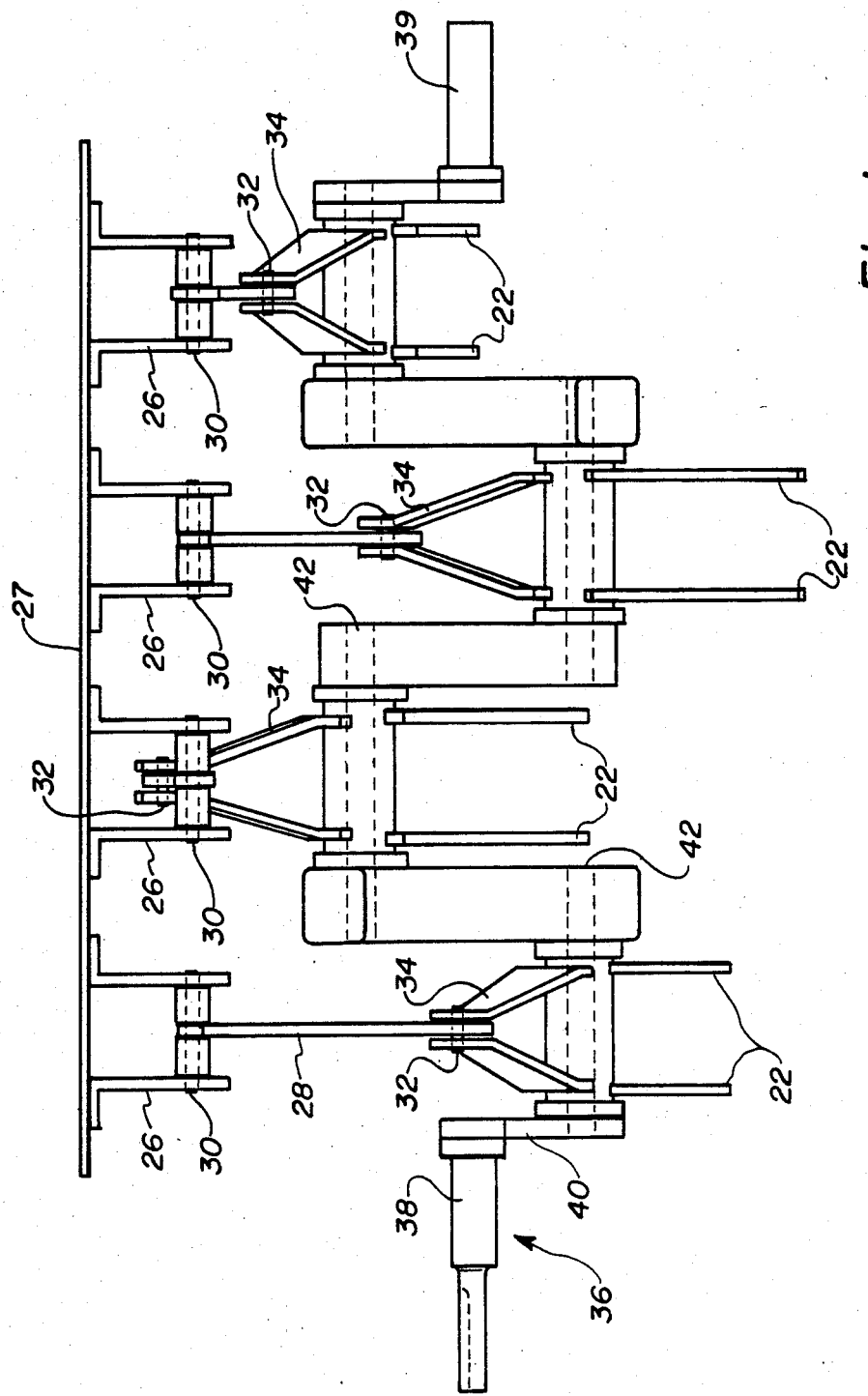
FIG. 1 is a front view of a packer mechanism.

Referring to the drawings, FIGS. 2 to 5 disclose an elongated feed chamber 10 having upper wall 12, lower wall 14 and side walls (not shown). The feed chamber 10 has a first substantially linear section 16 and second arcuate section 18. The feed chamber 10 includes a bulk head wall 20 which extends downwardly and connects with the upper wall 12. The upper wall 12 and the bulk head wall 20 include slots adapted for allowing tines 22 to penetrate into the feed chamber 10.

Figure 2:
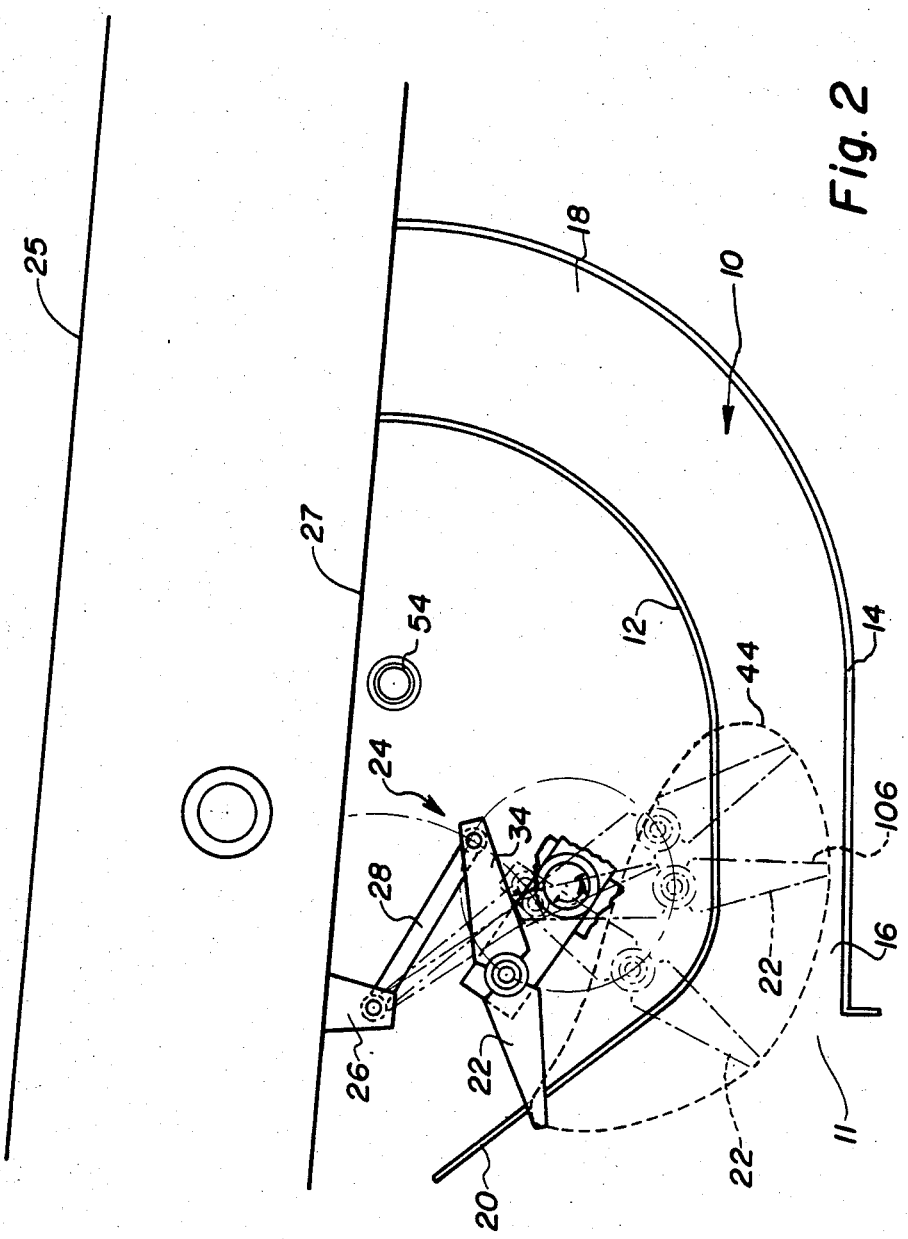
FIGS. 2 and 3 are schematic side views showing various positions of the packer mechanism of FIG. 1.
Figure 3:
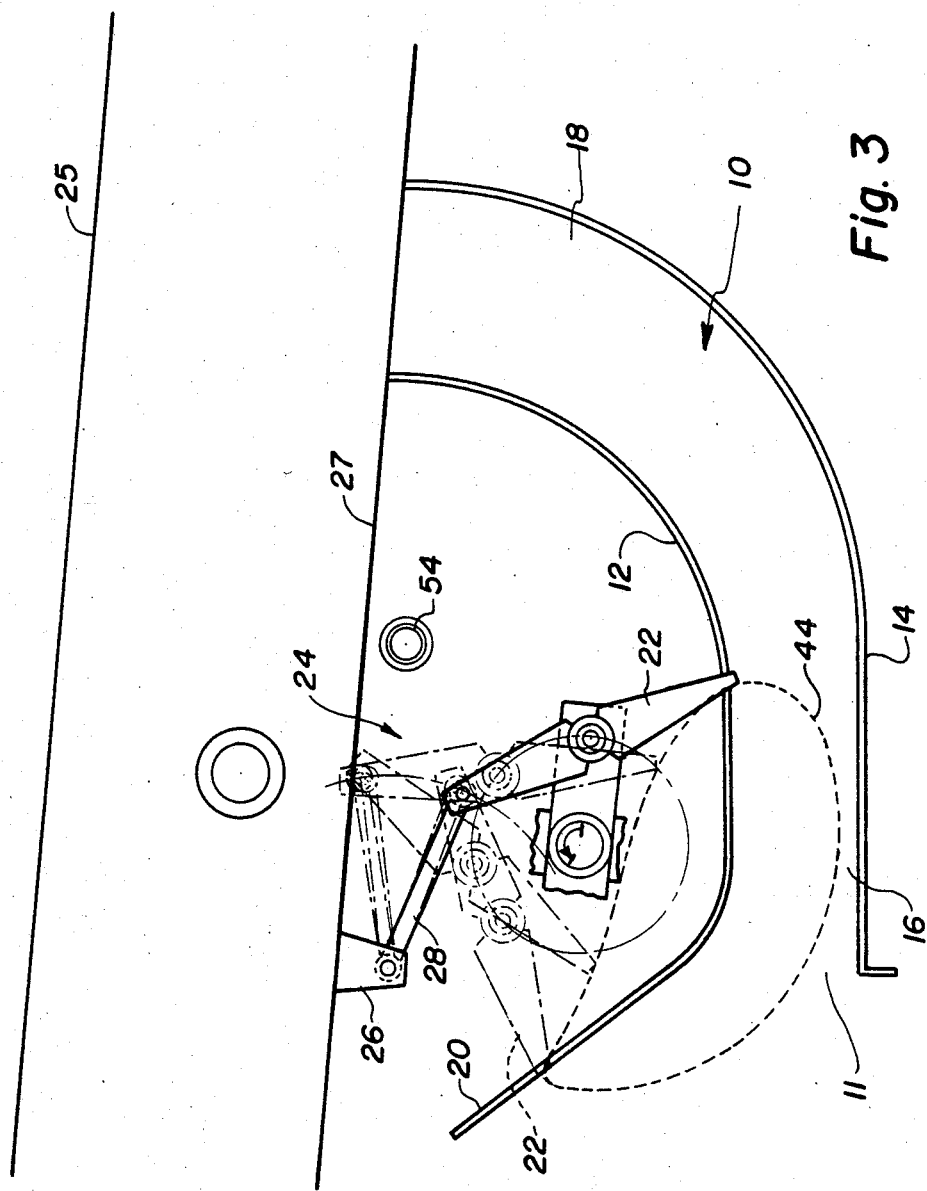

A packer mechanism, generally designated 24, is provided for receiving material at the opening 11 of the feed chamber 10 and for packing it into the feed chamber 10. Referring to FIGS. 1, 2 and 3, the packer mechanism 24 includes brackets 26 mounted on the bottom wall 27 of the bale case 25. Linkage members 28 are linked to respective brackets 26 by pins 30. Pins 32 link members 28 to the upper portions 34 of tines 22.

As seen in FIG. 1, a crank member 36 is provided having crank shafts 38 and 39. The crank shaft 38 is connected in a known manner to a rotation imparting device which is not shown. Crank shaft 38 is connected to crank arm 40 which is in turn connected to crank pins 42. Crank pins 42 are substantially parallel to pins 32. Tines 22 are rotationally mounted on crank pins 42 so that they may pivot thereabout.

By this construction, the packer mechanism 24 is capable of moving so that the tines 22 follow a path through the first section 16 of the feed chamber 10. Additionally, the crank 36 allows the tines 22 to move into and out of feed chamber 10 so that the tines 22 may penetrate the slots of feed chamber 10 and sweep from one end to the other end of section 16 and then emerge from the slots of feed chamber 10. As can be seen from FIG. 2, the motion of the packer mechanism 24 results in the tips of the tines 22 following a substantially kidney-shaped path 44.

Figure 4:
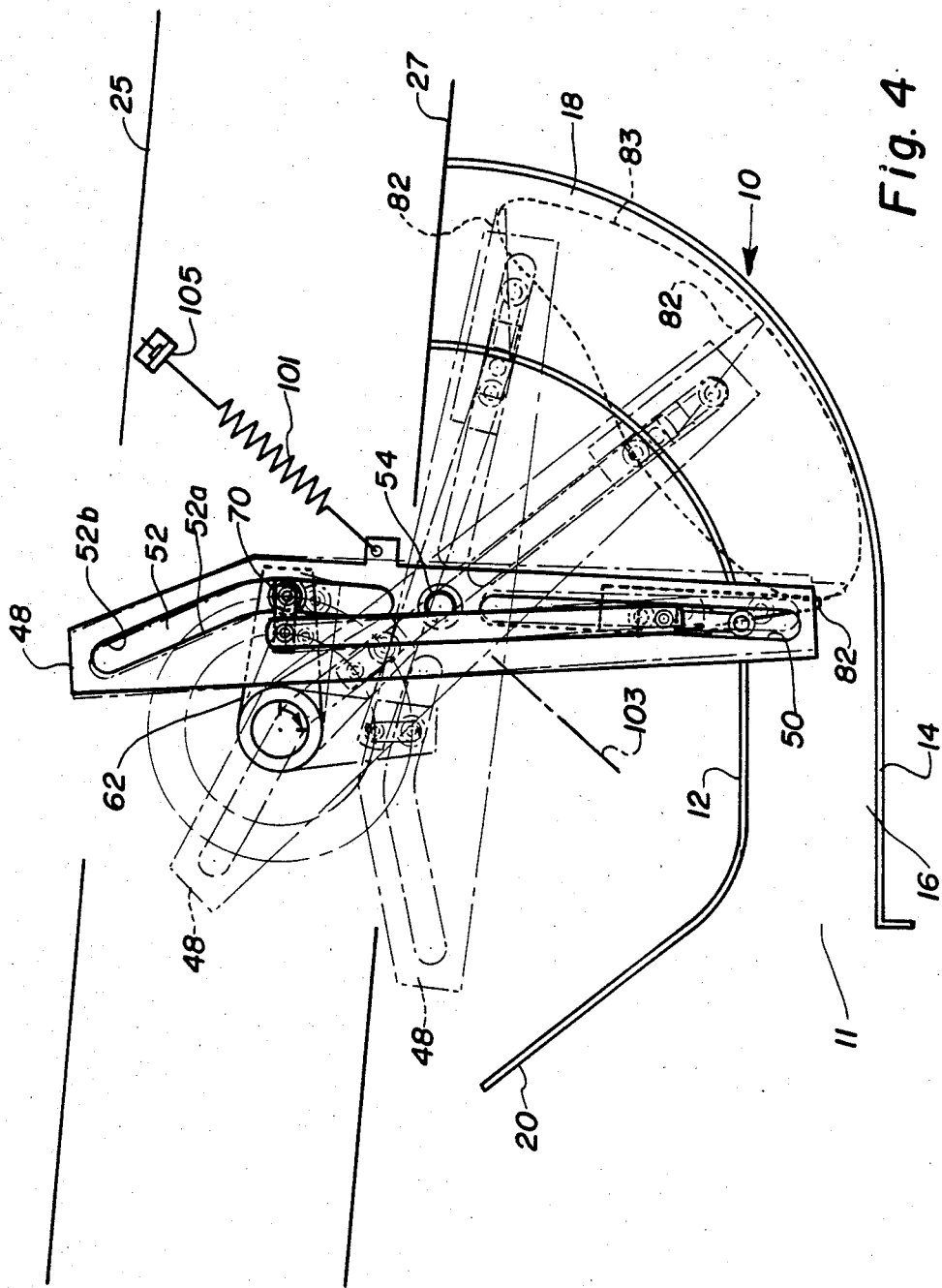
FIG. 4 is a schematic side view showing a stuffer mechanism of the present invention in one position in solid line and in various other positions in phantom.
Figure 5:
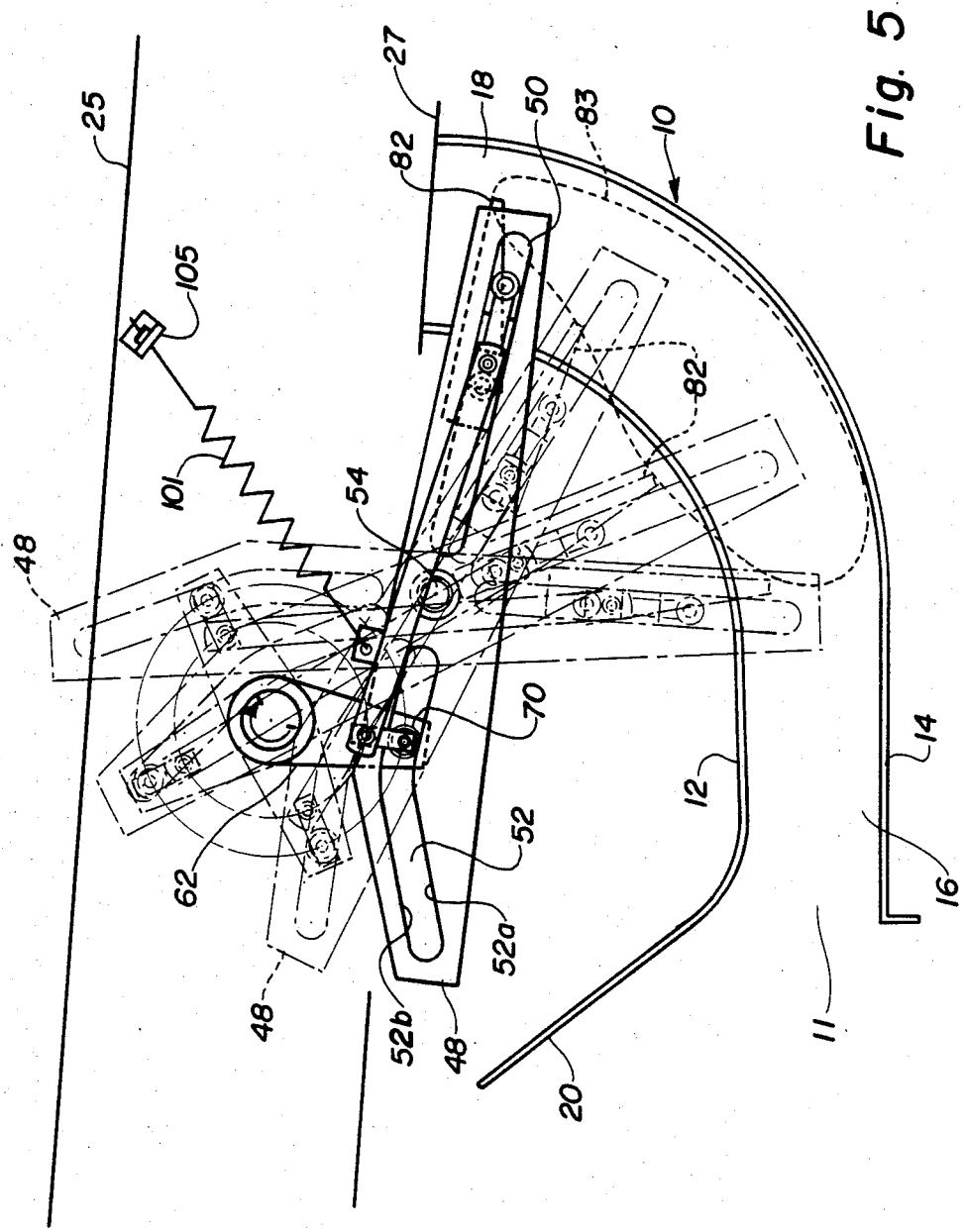
FIG. 5 is another schematic side view of the stuffer mechanism in various other positions.
Figure 6:
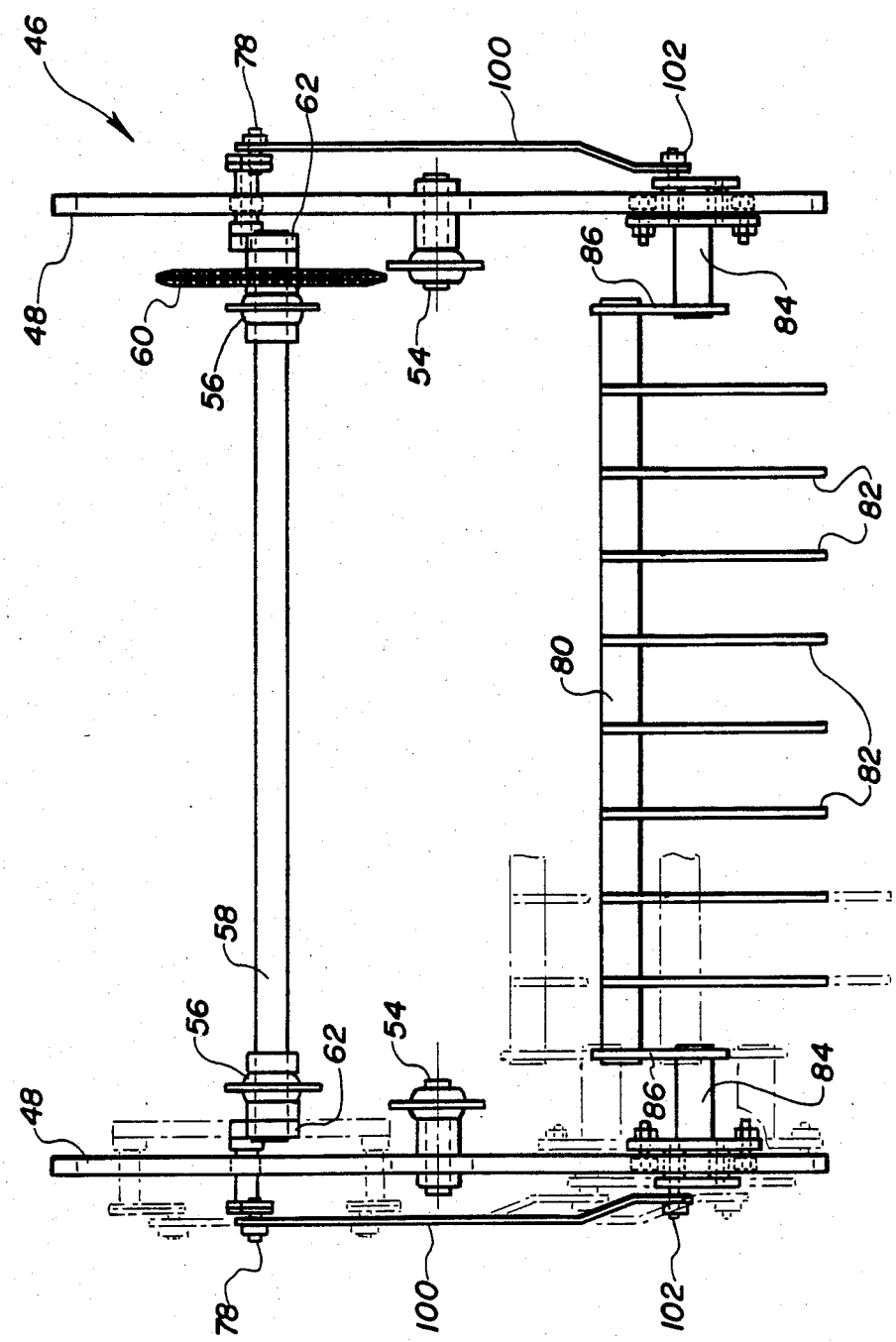
FIG. 6 is a schematic plan view of the stuffer mechanism of FIGS. 4 and 5.

Referring to FIGS. 4–7, there is shown the stuffer mechanism according to the present invention. The stuffer mechanism generally designated 46 includes levers or slotted members 48 each having a first slot 50 and a second slot 52. Slotted members 48 are pivotally mounted on respective fixed shafts 54 with the shafts 54 each positioned between a first slot 50 and a second slot 52. As best seen in FIG. 6, there are two fixed shafts 54, one provided adjacent each side of the feed chamber 10 so that each fixed shaft 54 acts as a pivot member for a slotted member 48.

A crank shaft 58 extends from one side of feed chamber 10 to the other side of feed chamber 10. Crank shaft 58 is provided with a drive means 60 at one end in the form of a chain drive, belt drive or the like for rotating the crank shaft 58 in bearings 56. At each end of the crank shaft 58 there is provided a crank arm 62 which extends a short distance from the center of the crank shaft 58. Crank arms 62 are keyed or the like to respective ends of the crank shaft 58. At the end of each crank arm 62, there is provided a hole 64 receiving a crank pin 66. As best seen in FIG. 7, a slide or roller member 70 is rotatably positioned on each of the crank pins 66. By this construction, as crank shaft 58 is rotated, members 70 are engaged in slots 52 thereby, due to the shape of slots 52, causing slotted members 48 to pivot on fixed shafts 54 and reciprocate back and forth between a substantially vertical position shown in solid line in FIG. 4, and a substantially horizontal position shown in solid line in FIG. 5.

As best seen in FIG. 7, attached to the distal end of each crank pin 66 away from crank arm 62, there is provided a member 72 which has a first bore 74 and a second bore 76. First bore 74 receives the end of crank pin 66 whereas second bore 76 receives a stub pin 78. Since crank pin 66 is fixed in hole 64, member 72 remains in fixed relationship with respect to crank arm 62 as crank shaft 58 is rotated.

As best seen in FIGS. 6 and 7, the stuffer mechanism 46 includes a tine support bar 80 which is adapted to support a plurality of stuffer tines 82. Tine support bar 80 extends from one side of feed chamber 10 to the other side of feed chamber 10 so that the plurality of stuffer tines 82 may penetrate slots in the upper wall 12 of the second section 18 of feed chamber 10. Offset from, and parallel to tine support bar 80 there is provided a spacer bar 84 at each side of the tine support 80. Spacer bar 84 is connected to and offset from tine support bar 80 by inner plates 86 provided at each end of the tine support bar 80. At each end of tine support bar 80, spaced from and parallel to plates 86 there are provided intermediate plates 88. Each of the plates 88 is provided with a first slide member or upper roller 90 and a second slide member or lower roller 92. Each of the rollers 90 and 92 are adapted to roll or slide within slot 50 of one of the slotted members 48. As best seen in FIG. 7, between each of the rollers 90 and 92 there are provided two shafts 94 and 96. Shafts 94 and 96 extend through slotted members 48 and are connected to outer plates 98 on the side of slotted members 48 opposite inner plates 88. Shafts 94 and 96 may also carry rollers, or the like, to assist in providing smooth engagement with the slotted members 48. Linkage members 100 are rotatably connected to plates 88 and plates 98 by pins or the like 102. Linkage members 100 are also rotatably connected to stub pins 78. Attached to each slotted member 48 there is provided a spring 101 as shown in FIGS. 4 and 5. A first end of each spring 101 is connected to a slotted member 48 slightly above fixed shaft 54. The second end of each spring 101 is connected to a support bracket 105 mounted on a side wall of the base case 25.

OPERATION

In operation, the packer mechanism 24 cooperates with the stuffer mechanism 46 to move material through the feed chamber 10 and into the bale case 25. Referring to FIG. 2, the packer mechanism 24 has tines 22 positioned to sweep down along the path 44. During the sweep, the tines 22 are inserted an increasing amount, into the feed chamber 10 until the tines 22 reach their maximum insertion as shown in phantom at 106. After reaching the position shown at 106, the tines 22 begin to emerge from the feed chamber 10 and go through a standby stroke. A portion of the kidney-shaped path 44 as shown in FIG. 2, includes the tines 22 withdrawing from feed chamber 10 at the end of the first section 16 of feed chamber 10. The tines 22 withdraw from the feed chamber 10 and are subsequently repositioned at the uppermost part of the kidney-shaped path 44.

The stuffer mechanism tines 82 also follow a substantially kidney-shaped path 83 through the second section 18 of the feed chamber 10. As crank shaft 58 rotates, roller members 70 roll in slots 52 and cause slotted members 48 to reciprocate between their substantially horizontal position and their vertical position. During this motion, springs 101 aid in urging the roller members 70 to bear against sides 52a only, of slots 52. The arrangement of the springs 101 allows the roller members 70 free rotation along the slots 52 to exert greater force as the slotted members 48 leave the vertical position while the crank shaft 58 rotates. The force of springs 101 creates a torque in opposition to the direction of reciprocation of slotted members 48 about fixed shafts 54, effectively increasing the driving force at slots 52 to decelerate the slotted members 48 through the feed stroke or the stroke during which the tines 82 move through the feed chamber 10 toward the bale case 25. With springs 101 positioned according to the present invention, the slotted members 48 are forced to decelerate, under the influence of the springs 101, at a value that would normally be greater than that which would be imposed by only the crank shaft 58. This forces the roller members 70 to be maintained in contact with sides 52a of the slots 52.

As best seen in FIG. 4, the preferred arrangement of springs 101 is such that their line of action 103 intersects the central axis of fixed shafts 54 when slotted members 48 are in the substantially vertical position. By this construction, the springs 101 exert a greater force as the slotted members 48 are moved by the crank shaft 58 away from the vertical position. At the vertical position, the springs 101 are effectively neutral in that they do not urge the slotted members 48 in any direction. Further, the springs 101 are properly sized to accomodate the particular weight and inertial characteristics of the entire stuffer mechanism. This construction enables the roller members 70 to remain engaged with sides 52a of slots 52 while being free of engagement with sides 52b of slots 52.

As the slotted members 48 are reciprocating between their vertical position and their horizontal position, the linkage members 100 urge the tines 82 to reciprocate between a position closest to fixed shafts 54 and a position furthest away from fixed shafts 54. As can be seen in FIGS. 4 and 5, the tips of the tines 82 follow a substantially kidney-shaped path 83 as crank shaft 58 is rotated to deliver crop material from the feed chamber 10 into the bale case 25 through an opening 29 in the bottom wall 27 thereof.

It should be understood that the packer mechanism 24 as the rotary packer disclosed in U.S. Pat. No. 4,132,164.

It should also be understood that a plunger (not shown) will be mounted in the bale case 25 for reciprocation to compress crop material delivered by the stuffer mechanism 46 into bales.

In an alternative embodiment not shown, members 72 and stub pins 78 would be eliminated and the linkage members 100 would be rotatably connected to the crank pins 66.

While this invention has been described as having a preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and which fall within the scope of the invention of the limits of the appended claims.

Having thus described the invention, what is claimed is:

1. A baler feed assembly including a stuffer means mechanism comprising:
    a fixed shaft;
    a rotatable crank shaft spaced from said fixed shaft;
    a roller member associated with said rotatable crank shaft;
    a slotted member, movable about said fixed shaft, having a first slot engageable with said roller member and positioned on a first side of said fixed shaft and a second slot positioned on a second side of said fixed shaft;
    a support member supporting a plurality of tines;
    roller means movable within said second slot of said slotted member and attached to said support member;
    a linkage member, having a first end connected to said rotatable crank shaft and a second end connected to said support member thereby imparting reciprocable motion to said support member and said plurality of tines as the crank shaft rotates; and,
    means for biasing said slotted member so that said roller member engages only one side of the first slot during the rotation of said crank shaft thereby enabling said slotted member to smoothly reciprocate about said fixed shaft between a first position and a second position.

2. A baler feed assembly according to claim 1, wherein said means for biasing said slotted member includes at least one spring.

3. A baler feed assembly according to claim 1, wherein said means for biasing said slotted member includes a support spaced from said fixed shaft, and spring means having a first end secured to said support and a second end secured to said slotted member on the first side of said fixed shaft.

4. A baler feed assembly according to claim 1, wherein said slotted member is movable between a first substantially vertical position and a second substantially horizontal position, and said biasing means exerts a greater force as the slotted member is moved by the crank shaft away from the vertical position and toward the horizontal position.

5. A baler feed assembly according to claim 1, wherein said slotted member is movable between a first substantially vertical position and a second substantially horizontal position, and, the line of action of said biasing means is substantially coincident with the center of said fixed shaft when said slotted member is in its substantially vertical position.

6. A baler feed assembly according to claim 1, wherein said biasing means causes said roller member to be free of engagement with one side of said first slot.

7. A baler feed assembly including a stuffer means mechanism comprising:

a fixed shaft;
a rotatable crank shaft spaced from said fixed shaft;
a movable member associated with said rotatable crank shaft;
a lever, movable about said fixed shaft, having a first slot engageable with said movable member and positioned on a first side of said fixed shaft and a second slot positioned on a second side of said fixed shaft;
a support member supporting a plurality of tines;
means movable within said second slot of said lever member and attached to said support member; and
a linkage member, having a first end connected to said rotatable crank shaft and a second end connected to said support member thereby imparting reciprocable motion to said support member and said plurality of tines as the crank shaft rotates.

8. A baler feed assembly according to claim 7, wherein said lever is movable between a first substantially vertical position and a second substantially horizontal position.

* * * * *